Patented July 16, 1929.

1,720,716

UNITED STATES PATENT OFFICE.

GEORGE FREDERICK BLOMBERY, OF LANE COVE, NEAR SYDNEY, NEW SOUTH WALES, AUSTRALIA.

MANUFACTURE OF SURFACED PAPER SHEETS AND BOARDS.

No Drawing. Application filed March 26, 1926, Serial No. 97,776, and in Australia June 4, 1925.

This invention relates to an improved surfaced paper sheet process for surfacing paper sheets and paper boards. The objects of this invention are to render paper highly resistant to absorption of water; to improve the flexibility and thereby increase the folding number; to produce a smooth even gloss such as characterizes "art", "chromo" and glacé paper; and to diminish consumption of ink required for printing whilst maintaining satisfactory density in the prints.

The invention consists essentially in treating paper sheets and paper boards with surfacing preparations containing rubber latex, or rubber in emulsified condition. The addition of a little ammonia is sometimes desirable for maintaining a mobile condition of the rubber during treatment, and for preserving it.

The rubber, as latex, or as an emulsion in water, is associated with pigmenting, sizing, and surfacing materials according to the characteristics of the required finish. Rubber is inert to pigmenting, sizing, and surfacing materials which are commonly used in trade practice in the manufacture of paper.

The surfacing materials used in practice for compounding with the rubber are a colloidal clay, for instance, kaolin, to which may be added blanc fixe, satin white, barytes, talc, precipitated chalk, zinc oxide, either separately or as mixtures of two or more of them. For tints and colors, the appropriate usual tinting and coloring substances are added in the necessary proportion. Sizing materials may also be compounded with the rubber, in addition to one or more of the surfacing materials. The sizing material consists, for instance, of casein in an alkali solvent, glue, starch, gums, and resins. The size may be introduced into the pigments and surfacing materials prior to the addition of the rubber solution previously indicated. The pigmenting, sizing and surfacing material is admixed with the rubber latex, and proportioned according to the thickness and nature of the coating required, a denser and thicker coating being usually required for boards than for smooth thin papers. The compounded mixture of rubber with pigmenting surfacing and sizing materials is applied to the paper after manufacture and is not introduced into the paper stock before it passes through the paper machine.

When operating with latex, the treatment liquid or dope is prepared by thoroughly intermixing the latex with the colloidal clay in the form of slurry prepared by the addition of water and by the subsequent addition, if desired, of such pigmenting, sizing, and surfacing materials as may be called for, and the resulting dope is applied to the paper by means of a mechanical paper coating machine having a trough and rubber rolls or brushes which operate to lay and spread the rubbery composition on the paper or boards in a film. The paper and boards thus treated are immediately exposed to air to dry and set, and are finally calendered. After treatment and drying out, the paper sheets or paper boards may be submitted to "cold" vulcanization by exposure in a sulphur atmosphere at an appropriate temperature.

When operating with coagulated raw rubber, a putty-like product is first obtained by submitting the rubber to prolonged milling in water until it has been caused to absorb a large quantity of water. It is then introduced into a mixer and worked up and emulsified with a proportion of kaolin or like colloidal clay, (usually about two lbs. dry rubber to one lb. clay), water being added very gradually as intermixture progresses. When the rubber assumes an emulsified condition, which happens ordinarily within two hours, water may be added to thin the mixture out and bring it to the desired consistency. At this stage the sizing, pigmenting and surfacing materials are introduced and worked into the emulsion.

A desirable method to obtain the rubber in an emulsified condition is by first breaking it down with a known solvent and bringing the putty-like or liquefied rubber into the mixer with the colloidal clay; the manufacture then proceeds as before described.

The rubberized dope or surfacing liquid produced in the manner described is thinned with water before application to the paper or paper boards the surfaces of which are, preferably, sized prior to the application of the surfacing liquid so that in the brush or roller treatment a thin film is applied; this thinning may be done immediately after the mixing of the rubber and the associated ingredients. It is not necessary to brush or buff-up after drying to obtain a fine surface. An effective surfacing mixture may be made by mixing 10 lbs of kaolin associated with sufficient water to make it into a thick slurry with 4 pints of rubber solution or stabilized latex in a rubber mill or rotary mixer until thoroughly emulsified. To this emulsion 20 lbs. of blanc fixe, 5 lbs. of satin white, 1½ lbs. of casein, and ½ lb. of talc are added with water up to 4 or even 5 lbs. and the mixture again subjected to agitation in a rubber mill or rotary mixer. The mixture should be about the consistency of glycerine, and further water may be added to attain this consistency. The mixture is strained through an 80 to 90 mesh screen and is then ready for application in the manner described.

The treated paper is not heavy and bulky as are most surfaced papers now in use, and it is resistant to rapid decay and deterioration. Furthermore, papers treated by this process are found to be not liable to curl, fuzz, or cockle. There is no risk of producing a "mottled" effect, and the paper does not "pick" or "lift"; it is brighter than most stock papers now obtainable, particularly for multi-color work. The saving in printers' ink is very considerable, amounting to 30% or more than the best consumption obtainable with stock types of art and chromo papers.

What I claim as my invention and desire to secure by Letters Patent is:—

1. A process for finishing paper and paper boards which comprises applying to the surface thereof a liquid finishing material including a rubber latex and kaolin.

2. A process for finishing paper and paper boards which comprises applying to the surface thereof a liquid finishing material including a rubber latex and a colloidal clay.

3. A process for finishing paper and paper boards which comprises applying to the surface thereof a liquid finishing material including a rubber latex, kaolin and other sizing or surfacing materials.

4. A process for finishing paper and paper boards which comprises applying to the surface thereof a liquid finishing material including a rubber latex, colloidal clay, and other sizing or surfacing materials.

In testimony whereof I affix my signature

GEORGE FREDERICK BLOMBERY.